R. A. & C. F. LEATHERWOOD.
COTTON STALK CUTTER.
APPLICATION FILED SEPT. 14, 1910.

1,011,128.

Patented Dec. 5, 1911.

Witnesses
E. Larson
Charles A. Wilson

Inventors
Roy A. Leatherwood
Chas. F. Leatherwood
By Beeler & Robb
Attorneys

UNITED STATES PATENT OFFICE.

ROY A. LEATHERWOOD AND CHARLES F. LEATHERWOOD, OF VICTORIA, TEXAS.

COTTON-STALK CUTTER.

1,011,128.   Specification of Letters Patent.   Patented Dec. 5, 1911.

Original application filed May 27, 1910, Serial No. 563,719. Divided and this application filed September 14, 1910. Serial No. 582,058.

*To all whom it may concern:*

Be it known that we, ROY A. LEATHERWOOD and CHARLES F. LEATHERWOOD, citizens of the United States, residing at Victoria, in the county of Victoria and State of Texas, have invented certain new and useful Improvements in Cotton-Stalk Cutters, of which the following is a specification, being a division of our application filed May 27, 1910, Serial No. 563,719.

This invention relates to corn or cotton stalk cutters and is designed particularly as an implement of this nature which will readily operate on two rows of corn or cotton.

Figure 1:
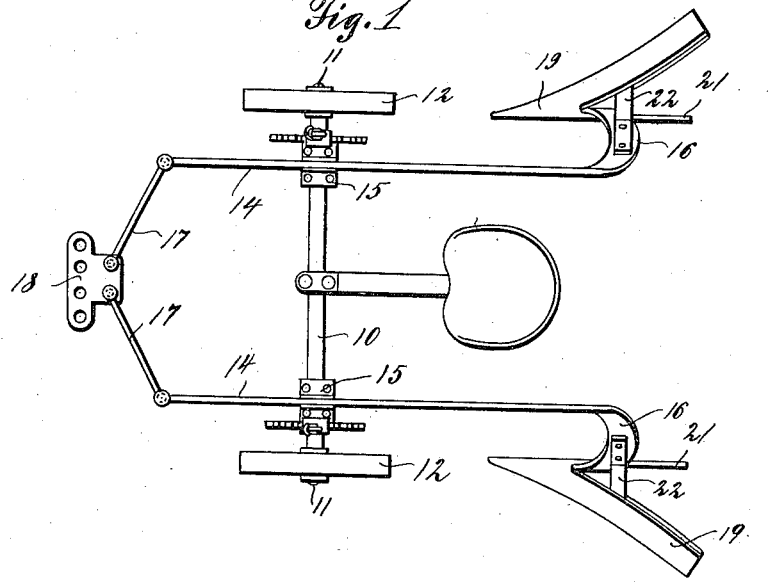
Figure 2:
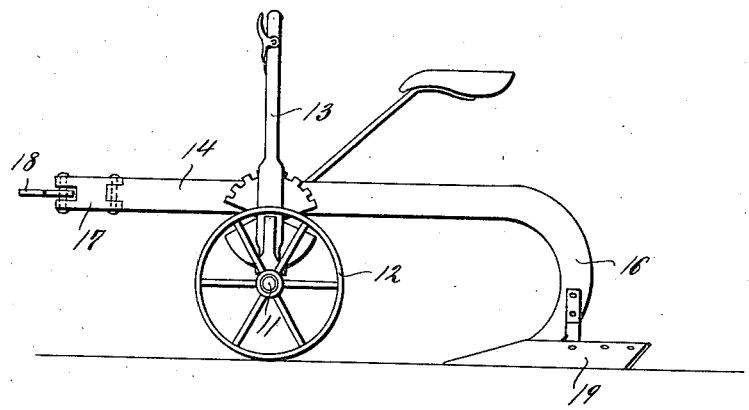

With the above and other objects in view, this invention consists in the combination, construction, and arrangement of parts, all as hereinafter more fully described, claimed and illustrated in the accompanying drawings, wherein:

Figure 1 is a top plan view of the corn or cotton cutter constructed in accordance with the present invention; Fig. 2 is a side elevation thereof.

Referring more particularly to the drawings, 10 indicates a hollow beam having angularly bent axles 11 mounted at each extremity thereof, said axles being provided with the wheels 12. Any suitable means such as the levers 13, are provided whereby the height of the beam 10 above the ground may be adjusted. A pair of longitudinally extending parallel arms 14 are mounted on the beam 10 through the instrumentality of the brackets 15, said arms having their rear terminals 16 bent downwardly and outwardly. A link 17 is pivoted on the forward terminals of each arm 14 and have pivotally secured to the free terminals thereof a draft-rigging 18. Carried by the lower terminals of the downwardly and outwardly extending extremities 16 of the arms are the diverging cutting knives 19 which are provided with the braces 22 interposed between said cutting knives and the curved portions 16. The cutting knives also have secured thereon the guides 21 which extend rearwardly and vertically against the ground, said guides retaining the knives to a certain extent in contact with the stalks to be cut.

From the foregoing it will readily be seen that by operating the cutter, forming the subject matter of the present invention, between two rows of corn, in as much as the knives 19 are oppositely disposed, the same will operate upon both rows.

It will be observed that the guide members 21 are located directly in the rear of the wheels in such a manner that the inner walls of the path or depression made by the wheel will serve for said guide members 21 to run in. It will also be noted that the machine herein disclosed will perform its cutting action both above and below the surface of the ground.

Having thus described our invention, what is claimed as new is:

In a device of the class described, the combination with a supporting beam, of wheels mounted on said beam, arms carried by said beam having their rear terminals bent downwardly and outwardly and terminating in the path of the wheels, vertical guides carried by said terminals in the path of said wheels, divergent cutting knives secured to said guides, brace members connecting said knives to said arms, and link members pivotally secured to the forward terminals of said arms and connecting the latter with a draft rigging, as set forth.

In testimony whereof we affix our signatures in presence of two witnesses.

ROY A. LEATHERWOOD.
CHAS. F. LEATHERWOOD.

Witnesses:
J. P. POOL,
HAMP WEAVER.

Copies of this patent may be obtained for five cents each, by addressing the "Commissioner of Patents, Washington, D. C."